United States Patent [19]
Aker

[11] 3,847,444
[45] Nov. 12, 1974

[54] WHEEL MANUFACTURE

[75] Inventor: Ludwig E. Aker, Hamilton, Ontario, Canada

[73] Assignee: International Harvester Company, Chicago, Ill.

[22] Filed: June 18, 1973

[21] Appl. No.: 371,217

Related U.S. Application Data

[62] Division of Ser. No. 276,985, Aug. 1, 1972, Pat. No. 3,762,012.

[52] U.S. Cl. .............. 301/63 DD, 301/5 R, 305/21
[51] Int. Cl............................................. B60b 3/08
[58] Field of Search 301/5 R, 63 DD, 64 R, 64 SM, 301/65, 79, 11 CD; 29/159 R, 159.01, 159.02; 74/230.4, 230.8, 574; 305/24, 28, 56, 21

[56] References Cited
UNITED STATES PATENTS

| | | | |
|---|---|---|---|
| 1,308,035 | 7/1919 | Bowen | 74/230.8 |
| 1,393,795 | 10/1921 | Lachman | 301/63 DD |
| 1,404,395 | 1/1922 | Ibach | 301/63 DD |
| 1,404,411 | 1/1922 | Schenck | 301/63 DD |
| 1,648,626 | 11/1927 | Smith | 29/159 R |
| 2,320,163 | 5/1943 | Anderson | 301/63 DD |

Primary Examiner—Lloyd L. King
Assistant Examiner—Reinhard J. Eisenzopf
Attorney, Agent, or Firm—John W. Gaines; Floyd B. Harman

[57] ABSTRACT

A disk wheel with concealed spokes, having a hub and a wheel rim and primarily intended as a front idler for the track of crawler vehicles. Fabrication is by the steps of: providing a sub-assembly of a plurality of uniplanar spokes, radially positioned between and securing together the hub and rim; providing and positioning wheel disks on the sub-assembly, so provided with rows of radially oriented plug weld slots, and so oppositely positioned to one another, and upon opposite sides of the spokes, that the slots register with the radial edges of the spokes; and bonding-on the disks by plug welding same, in the slots, to the spokes and by bead welding same, on the peripheries, to the hub and rim.

6 Claims, 4 Drawing Figures

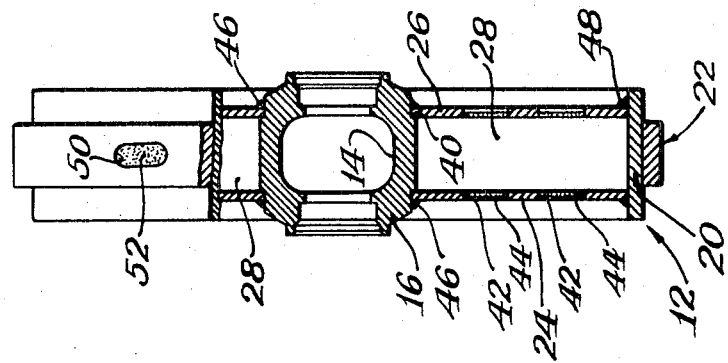
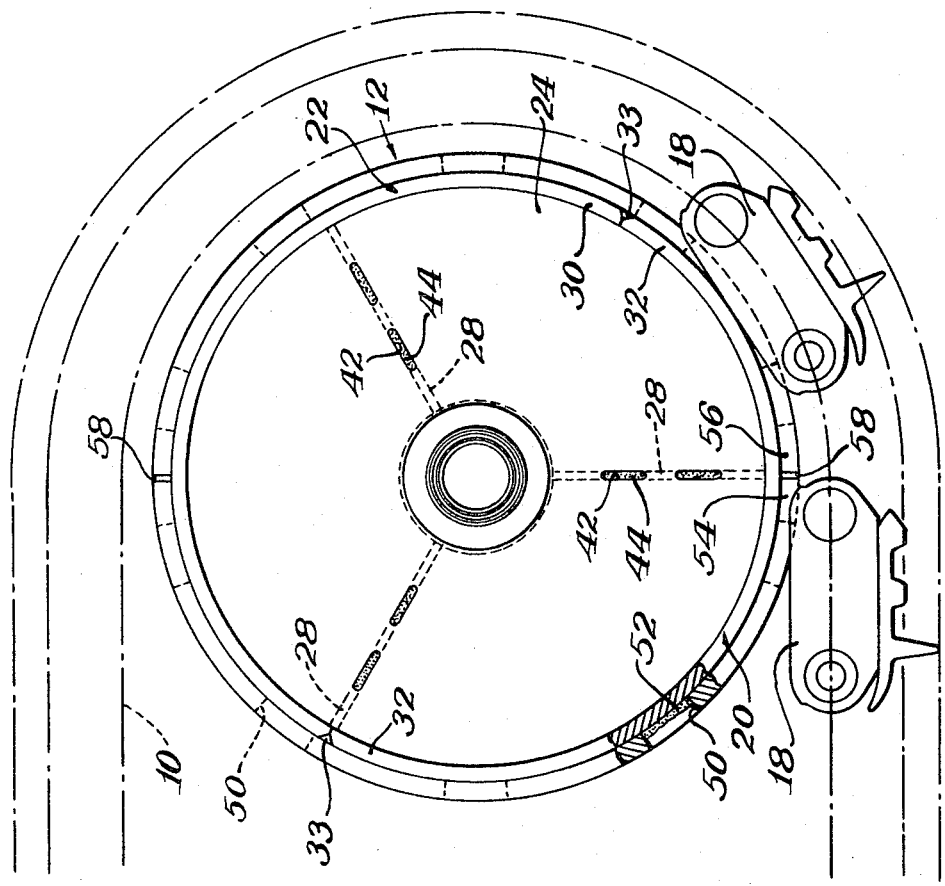

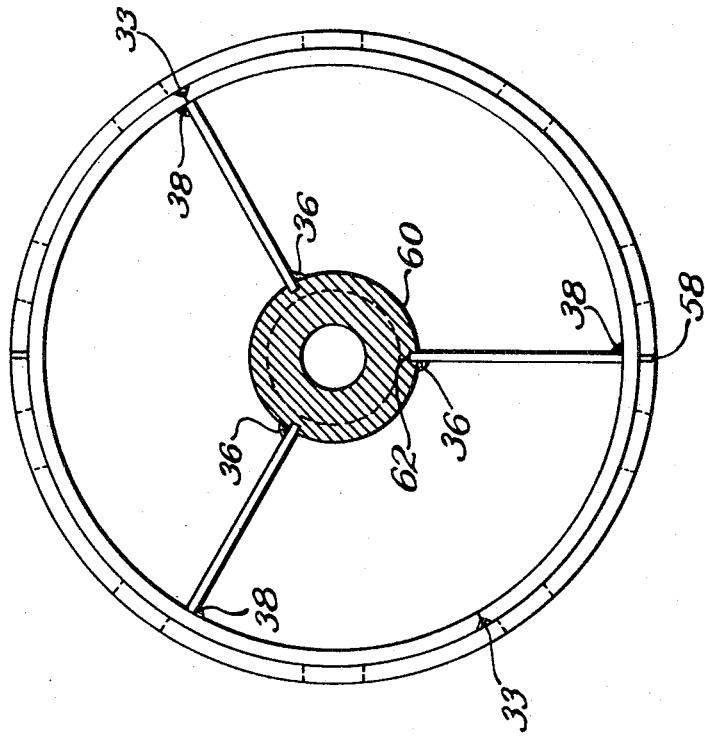
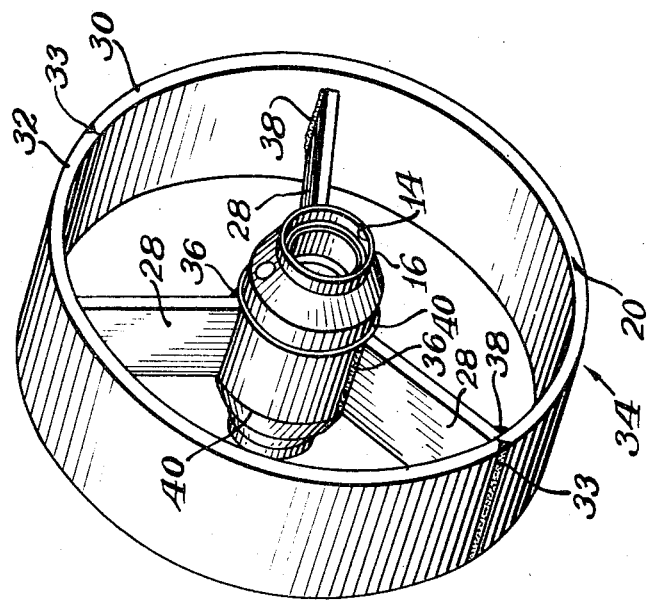

WHEEL MANUFACTURE

This is a division of application Ser. No. 276,985, filed Aug. 1, 1972 now U.S. Pat. No. 3,762,012.

This application relates to wheel manufacture and, specifically, to the method of fabrication and to the fabricated article which results.

The actual article is a disk wheel with concealed spokes, primarily intended as a track idler wheel for crawler vehicles.

Wheel spokes and wheel disks, though not necessarily incompatible structures, are generally used in lieu of one another in wheel fabrication. While a disk wheel is characteristically dressier, and also easier to keep clean, spokes are usually better for structural strength, pound for pound, in a wheel. There have been instances when spokes have been applied, usually to aid in strength or rigidity, in a disk wheel. The problem is to have the disk wheel retain its solid, dressy appearance and at the same time to have the spokes structurally integrated therein, in a way vitally augmenting the strength and rigidity without detracting from the wheel's look of integrity.

My invention materially reduces or substantially eliminates the foregoing problem as will now be described in detail. While the structure, having high load capacity in fact and integrity of appearance, is contemplated primarily for front idler use, the structure is equally applicable to other non-ground contact uses and also to ground contact uses over a wide range.

Features, objects, and advantages will either be specifically pointed out or become apparent when, for a better understanding of my invention, reference is made to the following description taken in conjunction with the accompanying drawings, which show certain preferred embodiments thereof and in which:

FIG. 1 is a face view of a track front idler wheel embodying the present invention;

FIG. 2 is an edge view in section;

FIG. 3 is an isometric view of the subassembly of rim, hub, and interconnecting uniplanar wheel spokes; and FIG. 4 is a face view in section of a modification.

More particularly in the drawings, the front portion of an endless track 10 for a crawler tractor, not shown, is trained over the toothless front idler wheel 12 such as found in each of the left and right suspensions of the tractor, or other crawler vehicle. A fore and aft shiftable idler fork, not shown, has the customary transverse shaft and wheel bearings received in the lubricant filled bore 14 of the hollow hub 16 of the wheel.

Track links 18 in the track 10 follow a path on the cylindrical outer face of a wheel rim 20 at opposite sides thereof, and are guided in that path by being astraddle of a track guide rib 22 forming a ring about the rim 20.

Oppositely positioned circular wheel disks 24 and 26 are secured between the hub 16 and the rim 20. Three equally spaced concealed spokes 28 between the disks 24 and 26 are radial load carrying braces interconnecting the disks, hub 16, and rim 20.

SUB-ASSEMBLY — FIG. 3

The rim 20 is in two parts, formed as semicircular rim segments 30 and 32 and secured together at two V-shaped gaps by end-to-end welds 33. The resulting circle of segments is part of a sub-assembly 34 including the hub 16 at the center and the spokes 28 all of which are properly assembled in a fixture for welding. When so positioned, the spokes at the inner end have bead welds 36 on one of their corresponding faces securing the spokes to the hub. The spokes at the outer end have bead welds 38 made on their opposite corresponding faces to the inner cylindrical surface of the rim 20. The midsection of the hub 16 terminates in two outwardly facing shoulders 40 and serves as a spacer for the oppositely positioned disks, not shown. The distance between the shoulders 40 equals the spoke width in the axial direction.

DISKS — FIG. 2

The disks 24 and 26 are each formed with three equally spaced rows of radially oriented slots 42, disposed two in a row, prior to being fitted up with the sub-assembly. The disks are applied axially to opposite sides of the spokes and rest against the latter and against the two shoulders 40. The disks are relatively rotated by the welder until the slots 42 and the radial edges of the spokes register, the slots providing apertures through which the welder makes plug welds 44 to the spoke edges. The slot width in one physically construction embodiment of the invention was one-quarter inch and the uniplanar spoke thickness was one-quarter inch.

A bead weld 46 is laid down between and secures together the face of the inner periphery of each disk and the adjacent reduced diameter portion of the hub 16. Similarly, a bead weld 48 is laid down between and secures together the face of the outer periphery of each disk and the circumferential inner face of the rim 20 in a plane inwardly offset from the adjacent axially outer end of the rim.

RIB — FIG. 2

The rib 22 has a row of circumferentially oriented slots 50, ten in number, the margins of which register with central zones along the outside of the rim and are secured thereto by plug welds 52. The rib is in two parts, formed as semi-circular segments 54 and 56 and defining two end-to-end clearance gaps 58 each measuring about 0.012 inch long. Although not essential for alignment purposes or solidarity, weld metal can be deposited in the end gaps 58 in those cases where desired. For such purposes, and the other purposes hereof, arc welding is employed, using welding rod compatible with the parent metal.

MODIFICATION — FIG. 4

While it occurs that the external cylindrical surface 60 of the wheel hub has the inner edge 62 of each spoke in tangency therewith as shown in the preceding embodiment, an interengagement can be effected in accordance with this modification to afford more than mere abutment.

Specifically, the external surface 60 is interrupted with three equally spaced apart axially extending slots 64 with which the spokes concerned are each interengaged at the inner end. Then, as in the preceding embodiment, the spokes have their inner ends on one of their corresponding sides bead welded at 36 to the surface 60, and have the outer ends on opposite corresponding sides, bead welded at 38 to the inner cylindrical face of the wheel rim. The welds are preferably, but not necessarily, continuous bead welds.

Because of the mutual bracing action imparted by the spokes to the disks and by the disks to the spokes, the preceding embodiments of hollow wheel have the strength inherent in properly installed uniplanar spokes and yet give the appearance of integrity mentally associated with wheels from which the spoke gaps are visually absent. The monolithic disks impart the desirable look of integrity without at the same time blocking off the welder from rigidifying the spoke plates thereto or, worse, requiring a solid metal design in the structure.

To further enhance the appearance of integrity at close inspection, enough arc weld metal can be deposited to completely fill each aperture shown in FIG. 2 and each aperture shown in FIG. 3, and then ground off flush with the outer surface. In generally that manner, that amount of rim weld material deposit is usually present at 33 as shown in FIG. 3 because necessary, although it is generally not so necessary for the plug welds and is somewhat undesirable as a practical matter from standpoint of manufacturing expense.

The wheel hereof has a cast hub, and the rest is strip metal or plate metal, e.g., carbon steel, so that the wheel has somewhat of a sheet metal appearance. Specifically, the spokes remain as flat bar or strip material. The disks remain as flat strip or plate stampings, punched in the appropriate zones with plug weld slots. The rim and rib are, as indicated, composed of flat strip or bar segments, of which the rib segments are punched in appropriate zones with the plug weld slots, and of which the rim segments are beveled at the ends on the outside. The segments are then formed by being permanently bent on the arc of concentric circles.

Variations within the spirit and scope of the invention described are equally comprehended by the foregoing description.

What is claimed is:

1. Disk wheel, including plural, concealed uniplanar spokes therein, the spokes consisting of individual radially positioned flat bars, and further including, in combination with said spokes:

disks positioned oppositely to one another, and upon opposite sides of the plural uniplanar spokes;

means in a plurality of zones bonding edges of the uniplanar spokes radially to zones of the disks adjacent the inner faces thereof, whereby to rigidify the spokes endwise against buckling out of plane under radial loads imposed on the wheel; and a rim connected in position to the disks and to the spokes, and fabricated of plural segments, end-to-end connected and bonded into said position contiguously encircling the disks and mutually normal to the spokes concealed therebeneath.

2. The invention of claim 1, the bonding means characterized by:

metallic weld plugs down in apertures in the disks which communicate with said disk inner faces.

3. The invention of claim 2, further comprising:

a wheel hub;

said disks and spokes each being between and securing together the wheel hub and the rim.

4. The invention of claim 1, further comprising:

track guide ring means having means in a plurality of zones thereof bonding same circumferentially to the outside of the rim.

5. The invention of claim 4 characterized by:

the guide ring means fabricated of plural segments, end-to-end connected and bonded about the rim as aforesaid.

6. The invention of claim 4, the bonding means characterized by:

metallic weld plugs deposited down in apertures in at least one of the group consisting of the disks and the guide ring means which communicate with the inner face of each apertured part concerned.

* * * * *